(12) United States Patent
Cremers et al.

(10) Patent No.: US 7,699,263 B2
(45) Date of Patent: Apr. 20, 2010

(54) INSTALLABLE RECLINING DEVICE FOR EMERGENCY MEDICAL AID OF PATIENTS

(75) Inventors: Joerg Cremers, Hamburg (DE);
Michael Supan, Jork (DE);
Klaus-Dieter Kricke, Pinneberg (DE)

(73) Assignee: Airbus Deutschland GmbH, Hamburg (DE)

( * ) Notice: Subject to any disclaimer, the term of this patent is extended or adjusted under 35 U.S.C. 154(b) by 256 days.

(21) Appl. No.: 11/774,045

(22) Filed: Jul. 6, 2007

(65) Prior Publication Data

US 2008/0006740 A1 Jan. 10, 2008

Related U.S. Application Data

(60) Provisional application No. 60/806,634, filed on Jul. 6, 2006.

(30) Foreign Application Priority Data

Jul. 6, 2006 (DE) .................. 10 2006 031 361

(51) Int. Cl.
*B64D 13/00* (2006.01)
(52) U.S. Cl. ............... 244/118.6; 244/118.5; 244/122 R
(58) Field of Classification Search ............... 244/118.5, 244/118.6, 122 R
See application file for complete search history.

(56) References Cited

U.S. PATENT DOCUMENTS

| 3,600,725 | A | 8/1971 | McCartney |
| 3,898,704 | A | 8/1975 | Gallaher et al. |
| 4,778,216 | A * | 10/1988 | Stupakis .................. 297/17 |
| 6,864,805 | B1 * | 3/2005 | Gomez ..................... 340/945 |
| 6,866,341 | B2 * | 3/2005 | Behnert ................. 297/423.26 |
| 2005/0040288 | A1 | 2/2005 | Keogh |
| 2006/0022087 | A1 * | 2/2006 | Defilla et al. ............ 244/118.5 |
| 2006/0060740 | A1 | 3/2006 | Sollazzo |

FOREIGN PATENT DOCUMENTS

| DE | 2318964 | | 10/1974 |
| DE | 9421813 | U1 | 11/1996 |
| DE | 19821692 | A1 | 12/1999 |
| DE | 19827275 | C1 | 12/1999 |
| DE | 69800184 | T2 | 10/2000 |
| DE | 69821223 | T2 | 11/2004 |
| DE | 60111277 | T2 | 12/2005 |
| DE | 69923201 | T2 | 12/2005 |
| DE | 69829445 | T2 | 2/2006 |
| EP | 1099627 | A1 | 5/2001 |
| RU | 2247682 | C1 | 10/2005 |

* cited by examiner

*Primary Examiner*—Christopher P Ellis
(74) *Attorney, Agent, or Firm*—Christopher Paradies; Fowler White Boggs P.A.

(57) ABSTRACT

In order to be able to provide in-flight emergency medical aid to patients on board more efficiently with minimum space, an aircraft, in one example, includes a seat device providing a first section of a reclining position region and a reclining position device which includes a second section of the reclining position region. In addition to use in aircraft, a reclining device, in one example, includes a seat device providing a first section of a reclining position region and a reclining position device, which provides a second section of the reclining position region, may also be used in other transportation vehicles.

13 Claims, 4 Drawing Sheets

INSTALLABLE RECLINING DEVICE FOR EMERGENCY MEDICAL AID OF PATIENTS

REFERENCE TO RELATED APPLICATIONS

This application claims the benefit of the filing date of German Patent Application No. 10 2006 031 361.5 filed Jul. 6, 2006 and of U.S. Provisional Patent Application No. 60/806,634 filed Jul. 6, 2006, the disclosures of which applications are hereby incorporated herein by reference.

FIELD OF THE INVENTION

The field relates to the technical field of aviation medical technology. Further, the field relates to an aircraft with a reclining position device that may be installed therein, as well as to the reclining position device itself, designed in particular for providing emergency medical aid to patients during the flight.

BACKGROUND OF THE INVENTION

During a flight, in particular a long-haul flight, it may not be ruled out that passengers or the aircrew may require emergency medical aid. For this purpose, it must primarily be ensured that the affected person to receive medical aid may be brought to a lying down position. However, in particular in modern passenger aircraft, there are space problems in this respect. This is due to ever more intensive use of space reserves for accommodating further seats or seat rows or passenger hand luggage.

In fully occupied aircraft it may be difficult to create a reclining position region for emergency medical aid by clearing a left-hand or right-hand seat row or both seat rows occupied by passengers. For example, passengers without seats would not have their belts fastened during the start phase and in particular during the landing phase. For this reason, the use of several seats for a patient is only feasible in the case of planned passenger transport. In this case, the seats have to be reserved in advance. A stretcher to be put onto the seats must be provided. Naturally, this procedure may be not possible in the case of a medical emergency during the flight.

Known permanent facilities for medical aid may require stowage space that could be used for further seats. Moreover, such facilities may be heavy, and, since more often than not, they are retrofitted facilities, they may be associated with comparatively high additional costs to the aircraft operator.

From US 2005/0040288 A1, a medical unit for aircraft is known. Disclosed in particular, is a frame onto which a reclining position device in the form of a stretcher may be placed and fixed. The frame is arranged over two seat rows and has to be stored, together with the reclining position device, in a stowage space specifically provided for this purpose. When the medical unit is to be used, the two seat rows have to be hinged over. In this way, the above-mentioned disadvantages of significant space requirements, of the use of more than one seat, and of the weight, are in particular not overcome by providing the stowage space by means of the medical unit according to US 2005/0040288 A1 and US 2006/0060740 A1.

SUMMARY OF THE INVENTION

Among other things, it may be an object, in particular during in-flight emergencies, to be able to provide a reclining position region that requires little additional stowage space, with the components of the reclining position region being designed such that no occupied seat is taken up.

This object may be met firstly by an aircraft, comprising a seat device by means of which a first section of a reclining position region may be provided, and a reclining position device by means of which a second section of the reclining position region may be provided. Furthermore, the object, as defined by the claims, may be met.

The seat device, preferably in the form of a passenger seat or a flight attendant seat, may be expanded by means of the reclining position device such that a reclining position region is created that is suitable for transporting a passenger or a member of the crew (patient) who has to be provided with medical aid, in particular emergency medical aid, in a lying down position. The seat that is no longer taken up by the patient may be taken up by that passenger whose seat device is expanded by means of the reclining position device.

The seat device may also be used for the planned transport of a passenger in cases where the passenger does not have to be brought to the reclining position in the takeoff and landing phases but only during the flight.

The reclining device, in one example, comprises a seat device providing a first section of a resting position region and a reclining position device providing a second section of a resting position region and may ensure that no seating capacities are lost. The reclining device may be used in transportation vehicles other than aircraft. The multifunctional use of the seat device expanded by means of the reclining position device may allow for considerable savings in weight because the seat area of the seat device provides a first section of the reclining position region, where the section will therefore no longer have to be fully provided by the reclining position device itself.

As an alternative, the reclining position device may form a reclining position area that is supported by the seat region of the seat device. In both alternatives, for example, the seat device is used to create the reclining position region.

In one improvement of the reclining device, the reclining position device is held by at least one retention device. The retention device is preferably attachable to an element of the aircraft, for example, to a wall element. In one example, the retention device is attached above the foot region of the reclining position device. By way of adjustment means that may be affixed between the retention device and the foot region of the reclining position device, the legs of the patient may be placed in an elevated position. This is known to improve the blood circulation situation of the patient. Direct or indirect fixed attachment of the retention device to the foot region of the reclining position device is also an option of the design of the seat device.

The reclining position device may be designed to take up particularly little space in that it comprises an inflatable reclining position element, for example, in the form of an inflatable pillow. The reclining position device may also be the reclining position element itself. In particular, the height of the inflatable reclining position element may at least correspond to the seat height of the seat device. For example, the term "height" may refer to the height of the reclining position element in its inflated state.

Preferably, the reclining position device may be brought from a storage state to a useable state by insufflating it with a fluid. Insufflation with the fluid may take place by means of a manually or electrically operated pump. In one example, the fluid is air provided by a ventilation system of the aircraft.

In a further embodiment of the reclining position device, when the reclining position device is in a storage state, the reclining position device may be capable of being integrated in the seat device so as to achieve further space savings. To this effect, the reclining position device may be deployably stored in the seat body of the seat device, preferably towards the seat edge.

In one example, the reclining position device may be fastened by means of sufficiently stable fastening elements in the form of textile elements underneath the seat body of the seat device.

In addition or as an alternative, during use, the reclining position device is supported by at least one support means. This support means may be designed in the form of a further inflatable cushion or of foldable or telescoping brace elements, for example, from light-weight structures, known per se, comprising composites, so as to result in a further reduction in stowage space.

In a further embodiment of the aircraft, the reclining position region may be monitored by means of video technology. The patient's state may be transmitted by means of telemedicine via a video signal to suitable display devices in the aircraft or on the ground. For example, a video device may monitor the reclining position region.

A further embodiment of the aircraft may be achieved by means of further medical modules. For example, the following may also be stored in the region of the reclining position device, such as the already present stowage space of the hat rack arranged above the reclining position device or at some other suitable location: electrical connections for medical devices; an oxygen supply for the patient; a telemedicine unit with communication connection; a curtain to provide privacy to the patient region; a handbook for installation of the medical region provided by the reclining position device and/or of the function of the medical devices; a compressed-air connection for inflating the reclining position element and/or the inflatable support element; an artificial-respiration device as well as the medicaments and infusion solutions required to provide emergency medical aid, and the supply means that are required for this.

The reclining position device for installation in an aircraft according to the above-mentioned embodiments and improvements of the aircraft also forms part of the reclining device and may be used as a retrofit part in already existing aircraft. In particular, the reclining position device may be used with the seat devices arranged in the door region or with the front seat devices in the form of passenger seats or aircrew seats.

A further support means of the reclining position device, for example, for supporting its foot region, is created by a flight attendant seat in its folded-out position.

BRIEF DESCRIPTION OF THE DRAWINGS

Below, the aircraft is explained in more detail with reference to exemplary embodiments. The following are shown.

DETAILED DESCRIPTION

The examples described and drawings rendered are illustrative and are not to be read as limiting the scope of the invention as it is defined by the appended claims.

Figure 1:
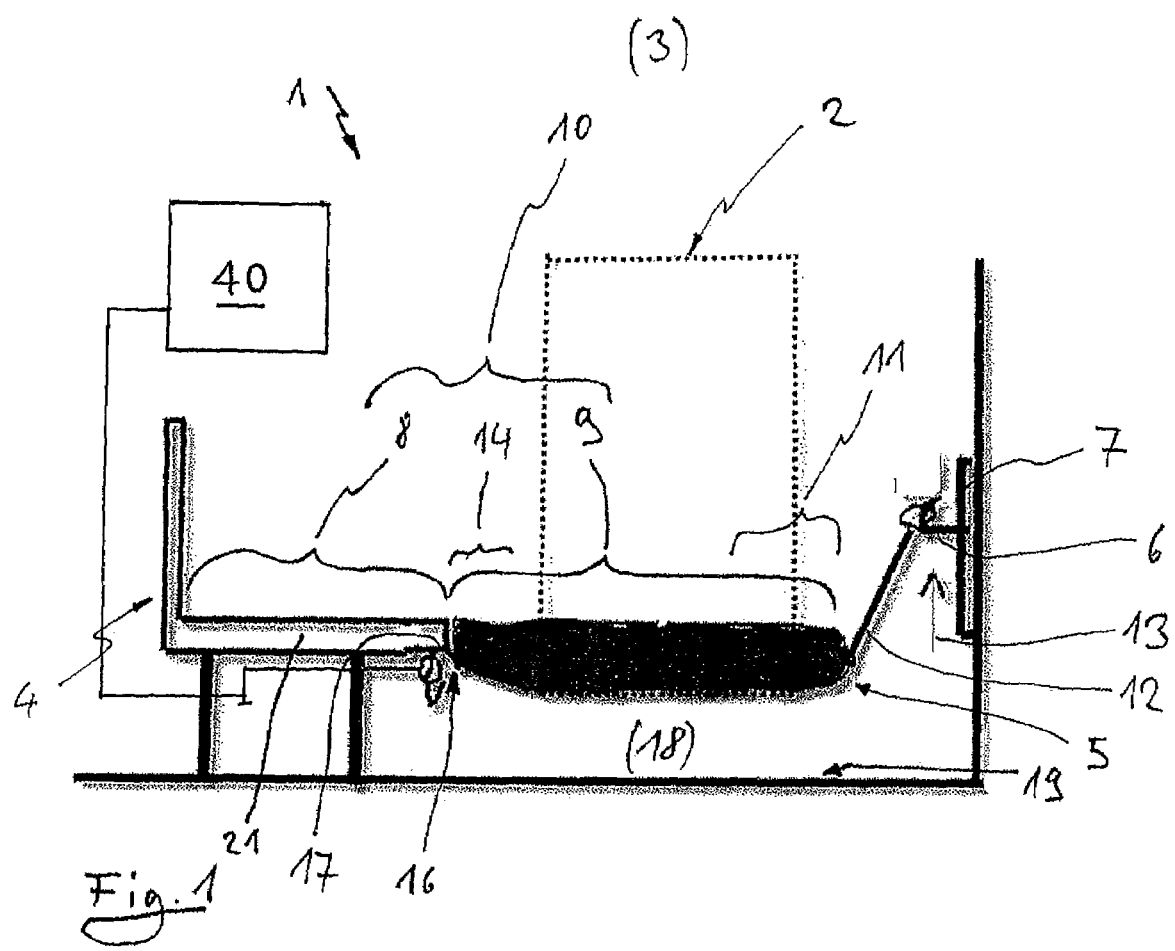
FIG. 1 shows a functional diagram of a first reclining position facility for emergency patients in an aircraft.

The reclining position facility 1, shown in FIG. 1, for a patient who requires emergency medical aid during the flight is located in the region of the door 2 of an aircraft 3 (not fully shown). The reclining position facility 1 is formed by a combination of a seat device 4 in the form of a passenger seat with a reclining position device 5 in the form of an inflatable cushion as well as a retention device 6 which is fastened in the region of a flight attendant seat 7.

The reclining position device 5 and the seat device 4 form the two sections 8, 9 of a reclining position region 10. In this arrangement, the head of the patient (not shown) is supported within the section 8 of the reclining position region 10, where the section 8 is formed by the seat device 4. This provides an advantage in that the patient's legs may be rested higher than the patient's torso in that the adjustment means 12 in the form of tension belts, where the adjustment means 12 are located between the foot region 11 and the retention device 6 and are fastened to the retention device 6, are shortened. The adjustment means may be designed to be height-adjustable in such a way, allows one to easily vary the position height, indicated by an arrow 13, of the reclining position device 5. The end region 14 of the reclining position device 5, where the end region 14 faces away from the foot region 11, is fastened by means of textile fastening means 16 to the lower front seat-edge 17 of the seat device 4.

In the free stowage space 18 in the floor region 19 of the aircraft 3, the shown reclining position facility 1 allows one to store a multitude of emergency medical means. The integrated storage state of the reclining position 5 within the seat body 21 of the seat device is not shown. By means of insufflation of a fluid into the reclining position device 5 pulled out from the seat body 21, the reclining position device 5 may be moved from a storage state (not shown) to a useable state 7. In this arrangement, the fluid in the form of air is provided by means of a compressed air connection. In one example, the fluid is air provided by a ventilation system 40 of the aircraft.

Figure 2:
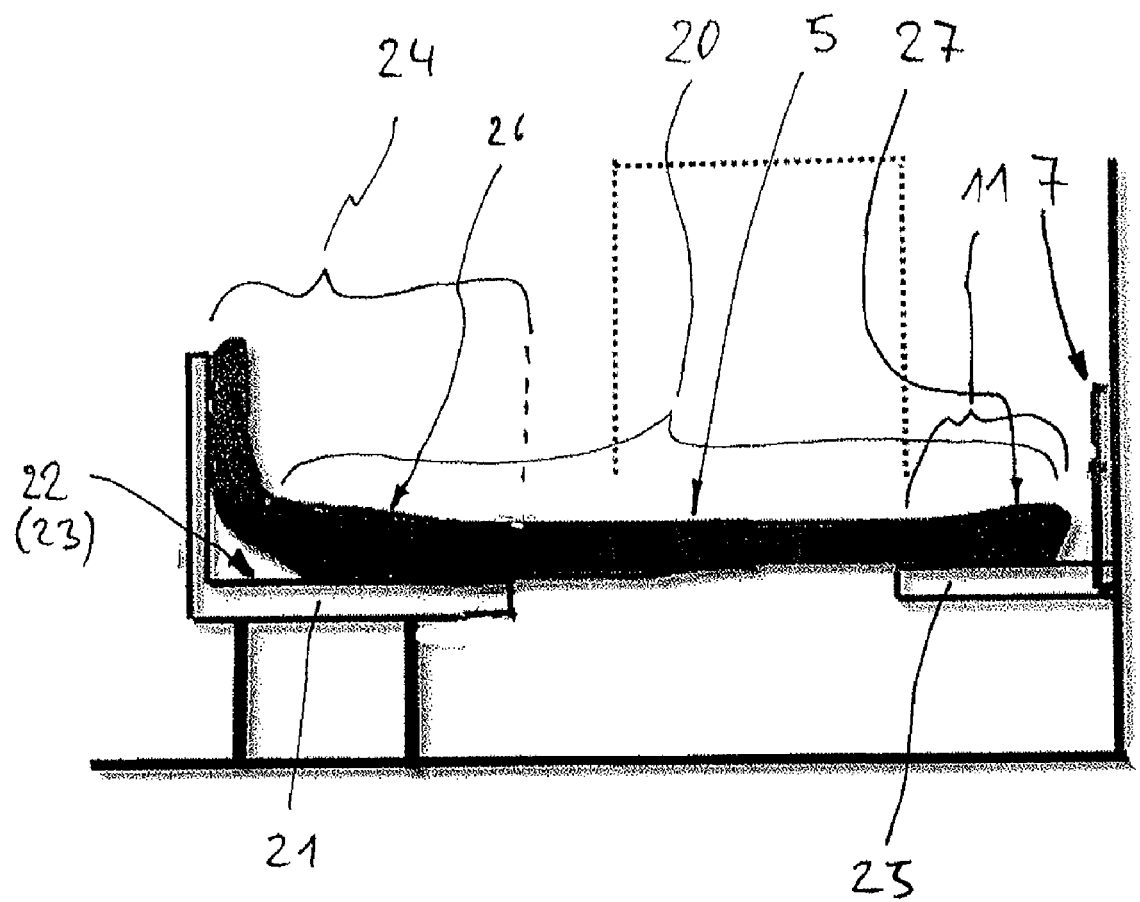
FIG. 2 depicts a functional diagram of a further reclining position facility.

In FIG. 2, the reclining position device 5 completely provides the reclining position area 20. In this arrangement, the seat body 21, in particular its seat region 22 of the passenger seat is used as a support means 23 for the head region 24 of the reclining position device 5. In the foot region 11, the reclining position device 5 is supported by the folded-out seat region 25 of the flight attendant seat 7. The special design in the form of the end-side thickening 26, 27 of the reclining position device 5 in the form of a reclining position element creates the option of keeping the patient's legs and head at elevated positions.

Figure 3:
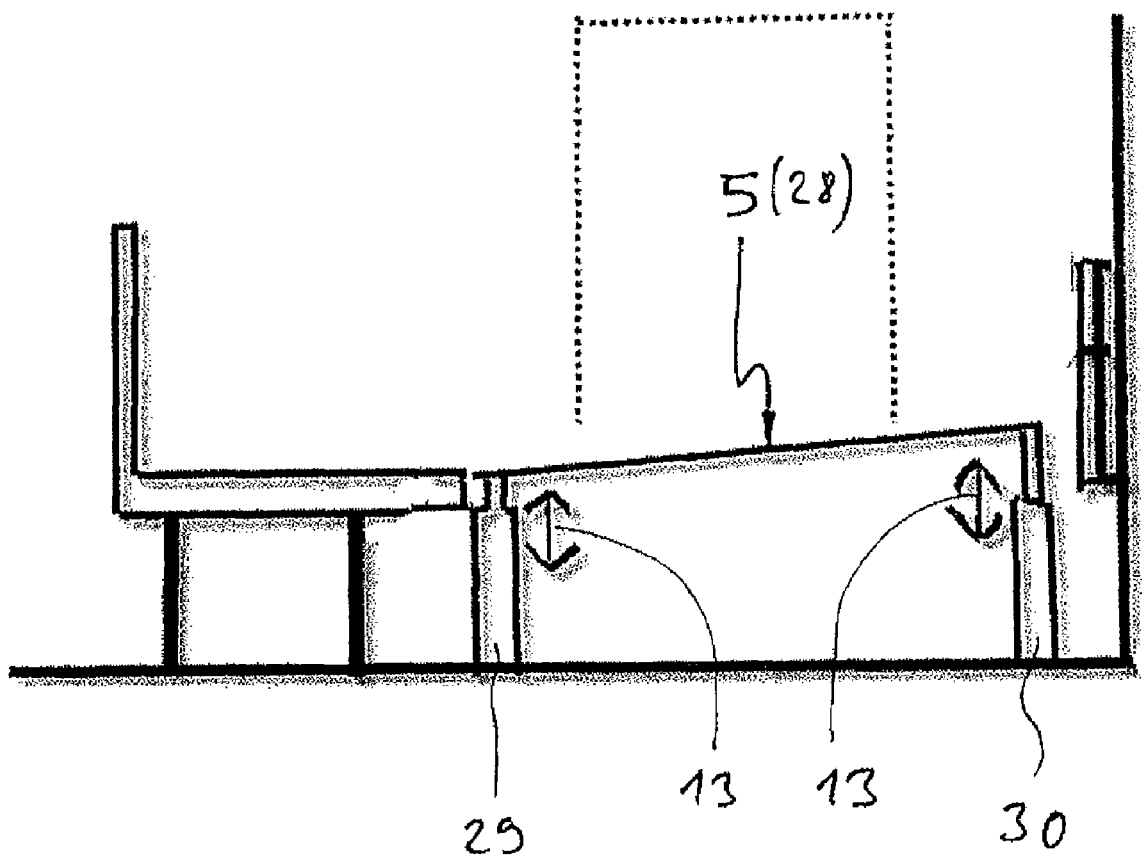
FIG. 3 illustrates a functional diagram of a third reclining position facility.

FIG. 3 shows a diagram of the reclining position device 5 as a frame 28, which by means of adjustable support means in the form of frame posts 29, 30 is also height-adjustable, as shown by the arrows 13.

Figure 4:
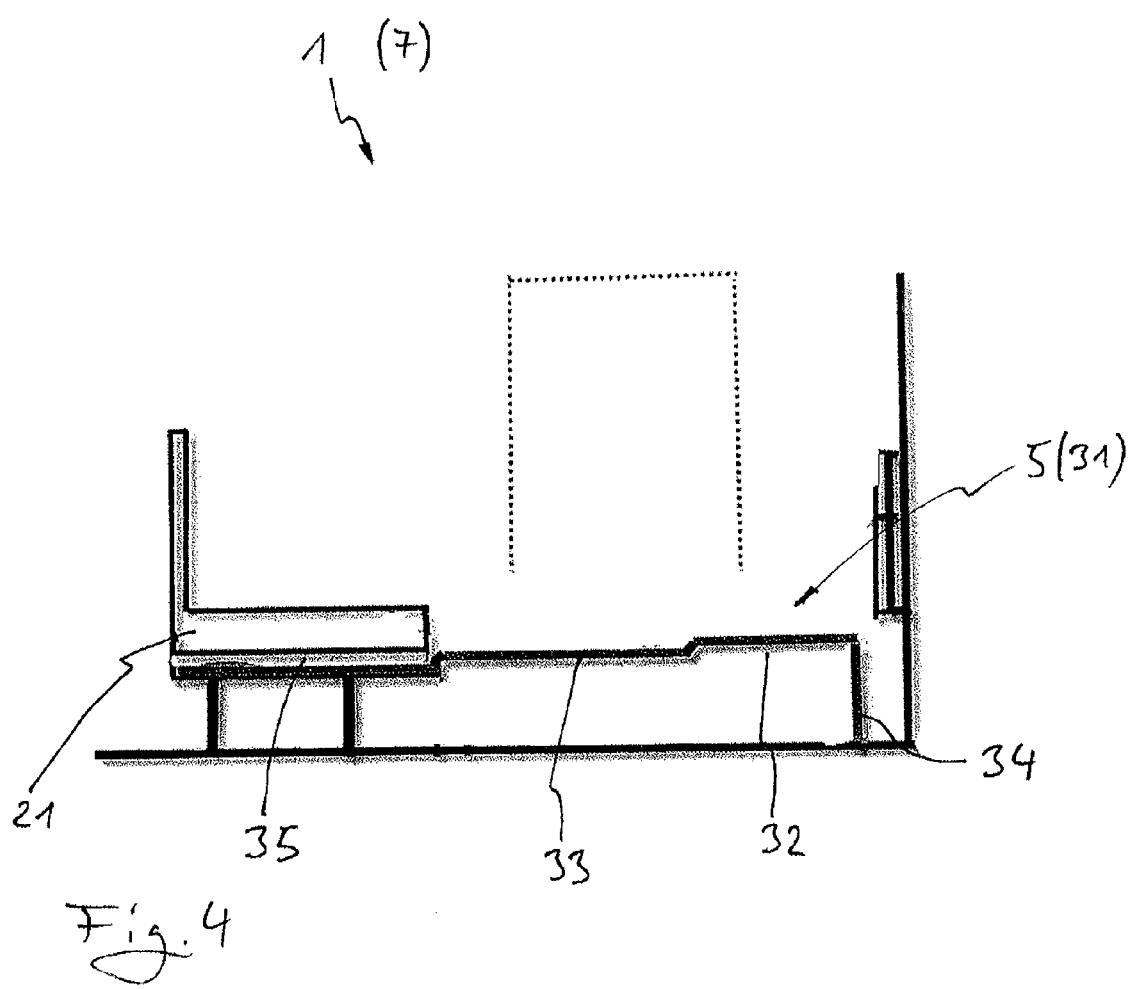
FIG. 4 shows a functional diagram of a fourth reclining position facility.

Finally, FIG. 4 shows a further embodiment of reclining position facility 1. In this example, the reclining position device 5 is designed as a frame 31 that may be slid underneath the seat body 21 of the passenger seat and is capable of being integrated in the seat device 4 and may also be folded out. For folding the frame 31 in, the part 32 of the frame is hinged upward on a hinge until it comes to rest on the part 33 of the frame 31. Subsequently, the part 34 of the frame is also folded, downwards, by way of a hinge onto the part 33. The three frame parts 32, 33 and 34, which are now positioned so as to be parallel in relation to each other, are pushed into the stowage space 35 which extends underneath the seat body 21. Moving the reclining position device 5 from its storage state to its useable state 7 takes place vice versa.

In addition, it should be pointed out that "comprising" does not exclude any other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims should not be understood in a restrictive sense.

Alternative combinations and variations of the examples provided will become apparent based on this disclosure. It is not possible to provide specific examples for all of the many possible combinations and variations of the embodiments described, but such combinations and variations may be claims that eventually issue.

LIST OF REFERENCE CHARACTERS

1 Reclining position facility
2 Door
3 Aircraft
4 Seat device
5 Reclining position device
6 Retention device
7 Flight attendant seat
8 Section of the reclining position region (seat device)
9 Section of the reclining position region (reclining position device)
10 Reclining position region
11 Foot region
12 Adjustment means
13 Arrow
14 End region
16 Fastening means
17 Seat edge
18 Stowage space
19 Floor region
20 Reclining position area
21 Seat body
22 Seat region
23 Support means
24 Head region
25 Seat region
26 Thickening
27 Thickening
28 Frame
29 Frame post
30 Frame post
31 Frame
32 Part of the frame
33 Part of the frame
34 Part of the frame
35 Stowage space

The invention claimed is:

1. An aircraft, comprising:
a door;
a plurality of passenger seats, each having only a limited facility for reclining, such that a passenger seated in one of the plurality of passenger seats cannot be reclined to a laying down position for emergency medical assistance; and
a reclining position facility for a passenger requiring emergency medical assistance, the reclining position facility being comprised of a combination of one of the plurality of passenger seats and a reclining position element, capable of being temporarily inflated, being coupled to the one of the plurality of passenger seats, and being retained in position by at least one retention device, such that a passenger suffering from an emergency medical condition may be positioned laying down for emergency medical assistance using the reclining position facility, without occupying more than one of the plurality of passenger seats.

2. The aircraft of claim 1, wherein a height of a horizontal portion of the reclining position element, when inflated, corresponds to at least a height of a horizontal portion of the one of the plurality of passenger seats.

3. The aircraft of claim 1, wherein the reclining position element is brought from a storage state to a useable state by inflating the reclining position element with a fluid.

4. The aircraft of claim 3, wherein the fluid is air and the air is provided by a ventilation system of the aircraft.

5. The aircraft of claim 3, wherein the reclining position element when in the storage state, is integrated in a seat device of at least one of the plurality of passenger seats.

6. The aircraft of claim 1, wherein the reclining position facility is monitored by a video device.

7. The aircraft of claim 1, wherein the reclining position facility is coupled to the one of the plurality of passenger seats disposed by the door, such that the reclining position facility is disposed in front of the door.

8. A reclining position facility for a passenger requiring emergency medical assistance, comprising:
a combination of one of a plurality of passenger seats of an aircraft, each of the plurality of passenger seats of the aircraft having only a limited facility for reclining such that a passenger seated in one of the plurality of passenger seats cannot be reclined to a laying down position for emergency medical assistance, and a reclining position element, the reclining position element being capable of being temporarily inflated, being coupled to the one of the plurality of passenger seats, and being retained in position by at least one retention device, such that a passenger requiring emergency medical assistance may be positioned laying down using the reclining position facility, without occupying more than one of the plurality of passenger seats.

9. The reclining position facility of claim 8, wherein a height of a horizontal portion of the reclining position element, when inflated, corresponds to at least a height of a horizontal portion of the one of the plurality of passenger seats.

10. The reclining position facility of claim 8, wherein the reclining position element is brought from a storage state to a useable state by inflating the reclining position element with a fluid.

11. The reclining position facility of claim 10, wherein the fluid is air and the air is provided by a ventilation system.

12. The reclining position facility of claim 10, wherein the reclining position element when in the storage state of the reclining position element, is integrated in the one of the plurality of passenger seats.

13. The reclining position facility of claim 8, wherein the reclining position facility is monitored by a video device.

* * * * *